United States Patent [19]

Wuyts et al.

[11] Patent Number: 4,538,201

[45] Date of Patent: Aug. 27, 1985

[54] SURGE PROTECTOR

[75] Inventors: Oscar Wuyts, Beveren-Waas; Remy F. Ruelens, Edegem; Lucien J. M. Van Camp, Zandhoven, all of Belgium

[73] Assignee: International Standard Electric Corporation, New York, N.Y.

[21] Appl. No.: 597,774

[22] Filed: Apr. 6, 1984

[30] Foreign Application Priority Data

May 2, 1983 [BE] Belgium .................................. 60084

[51] Int. Cl.[3] .............................................. H02M 1/04

[52] U.S. Cl. .................................... 361/124; 361/105; 337/140

[58] Field of Search ............... 361/119, 120, 124, 103, 361/105; 337/140

[56] References Cited

U.S. PATENT DOCUMENTS

| | | | |
|---|---|---|---|
| 3,901,576 | 8/1975 | Berman | 361/119 X |
| 3,959,691 | 5/1976 | Clarke | 337/388 X |
| 4,205,293 | 5/1980 | Melton et al. | 337/140 |

FOREIGN PATENT DOCUMENTS

| | | | |
|---|---|---|---|
| 26861 | 4/1981 | European Pat. Off. | 361/119 |
| 14214 | of 1913 | United Kingdom | 361/124 |
| 765050 | 1/1957 | United Kingdom | 361/124 |

*Primary Examiner*—Reinhard J. Eisenzopf

*Attorney, Agent, or Firm*—John T. O'Halloran; Thomas F. Meagher

[57] ABSTRACT

A surge protector with first and second electrodes, with a heat sensitive member and with a contact member which is electrically connected with the first electrode and which is mounted so as to be brought into contact with the second electrode upon the temperature of the heat sensitive member reaching a predetermined value when receiving heat from the protector. In an embodiment, the heat-sensitive member is composed of a material whose shape is a function of its temperature, such as a shape memory alloy. The heat sensitive member can also serve as the contact member.

9 Claims, 3 Drawing Figures

SURGE PROTECTOR

BACKGROUND OF THE INVENTION

1. Field of the Invention

The present invention relates to a surge protector with first and second electrodes, with a heat sensitive means and with a contact member which is electrically connected with said first electrode and which is mounted so as to be brought into contact with said second electrode upon the temperature of said heat sensitive means reaching a predetermined value when receiving heat from said protector.

2. Description of the Prior Art

In a known surge protector (manufactured and marketed by the French firm Campagnie Industrielle de Tubes et Lampes Electriques (CITEL), first and second electrodes are mounted in a heat and electricity conducting grounded metal body and are electrically and thermally connected to this body and isolated therefrom respectively. One end of a contact member which is resilient is fixed on the body so as to be able to receive heat therefrom and a heat sensitive, meltable element is arranged between the body and the contact member so as to maintain the other end of the contact member at a distance from the second electrode. When for instance due to the presence of a continuous voltage on the second electrode a continuous electric arc is produced in the gap between the electrodes and the body of the protector is heated above a predetermined temperature, the meltable element will melt. As a consequence the grounded resilient contact member will then come into contact with the second electrode and thus ground the latter so that the current flowing through the arc gap between the electrodes will be interrupted so that the protector body will no longer heat up, thus eliminating any danger for fire.

Other more complex surge protectors of this general type do not rely on a resilient contact but on the urging of a separate spring, e.g. U.S. Pat. No. 3,852,539 and French application 2,481,011.

BRIEF SUMMARY

An object of the present invention is to provide a surge protector of the above type but which does not use such a meltable element.

According to the invention the object is achieved due to the fact that said heat sensitive means is made of a material whose shape is a function of its temperature.

Such material includes, for instance, the material which comprises the metal used in a thermostatic switch because, upon being heated, such a metal gradually moves over a predetermined distance from a non-operative position to an operative position wherein it makes contact with the second electrode when the above predetermined temperature is reached. However, with such a thermostatic material, a relatively large temperature change is required to gradually move the contact over this predetermined distance.

Therefore, a further object of the invention is to obtain a more precise definition of the temperature conditions under which a connection is established between the electrodes than what could be achieved by the use of a thermostatic material.

According to the invention this object is achieved due to the fact that said material is a shape memory alloy.

Thus, for a precise operation, a shape memory alloy will be chosen, one of the general properties of which is a relatively abrupt change of shape at a temperature function of the alloy. Preferably one of the shape memory alloys marketed under the name PROTEUS (trademark) will be selected.

Either a reversible or an irreversible alloy may be used, i.e. one which is automatically reset to its initial position or not. In the first case no manual intervention is required after an operation of the protector, while in the second case a protector having operated can readily be identified.

Still a further object of the present invention is to provide a surge protector of a simpler structure than what would be achieved by using the heat sensitive material in cooperation with a contact member, as suggested above.

According to the invention this object is achieved due to the fact that said heat sensitive means also constitutes said contact member.

Thus the heat sensitive means is used to conduct current directly from the second to the first electrodes.

The above-mentioned and other objects and features of the invention will become more apparent and the invention itself will be best understood by referring to the following description of an embodiment taken in conjunction with the accompanying drawings wherein:

DETAILED DESCRIPTION

Figure 1:
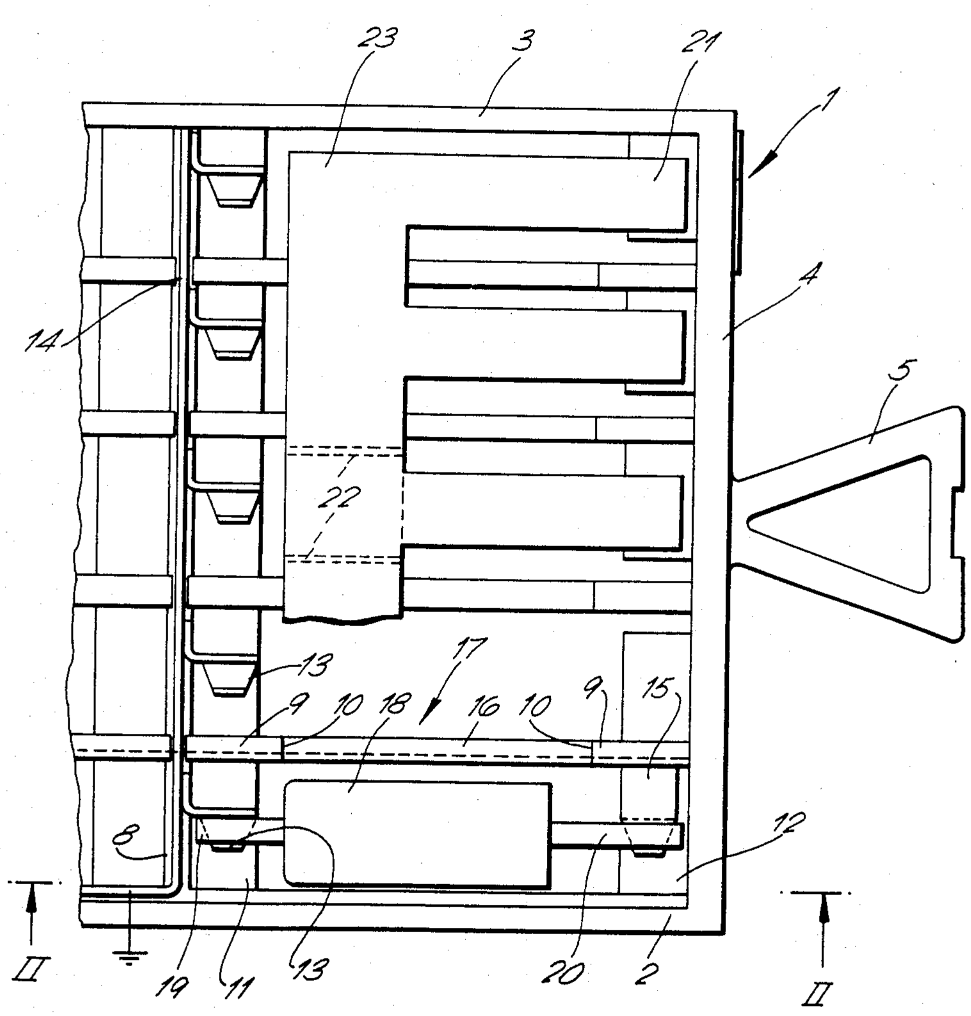
FIG. 1 is a top plan view of part of an assembly of a plurality of surge protectors according to the invention, the assembly being shown without top cover 6 and only one such protector 17 whose contact member 21 has been cut away being represented in detail.
Figure 2:
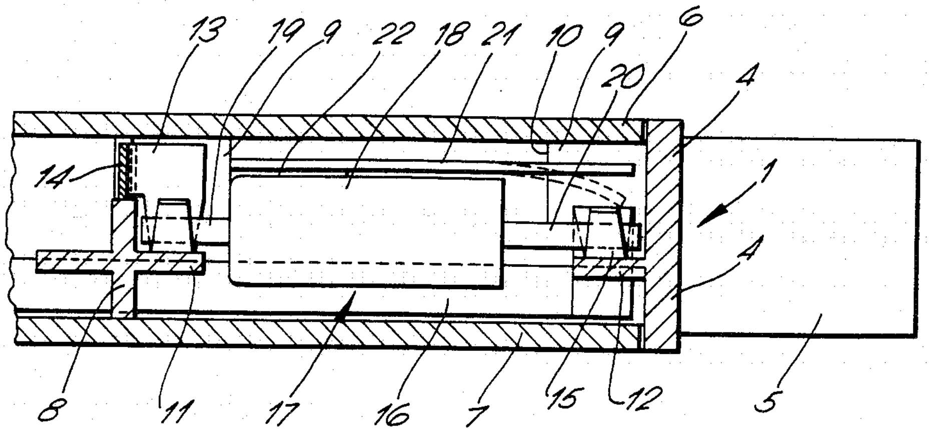
FIG. 2 is a cross-section along line II—II in FIG. 1 considered in the direction of the arrows.

The surge protector assembly represented in the figures includes a rectangular drawer-shaped plug 1 made of plastic material and only part of which is shown. This plug 1 has two upstanding side walls 2 and 3, two upstanding end walls of which only one end wall 4 which is integral with a hand-grip 5 is shown, a top cover 6 and a bottom plate 7 (FIG. 2). In FIG. 1 the top cover 6 has been omitted.

The part of the plug 1 shown is able to house five surge protectors being subdivided in five adjacent compartments by four intermediate longitudinal walls such as 9 which are parallel to the side walls 2 and 3 and recessed as shown at 10. The five compartments are also defined by an intermediate transverse wall 8 parallel to end wall 4 and only one is shown in detail. The transverse wall 8 is integral with an electric contact supporting plate 11, while the end wall 4 is likewise integral with an electric contact supporting plate 12.

Plate 11 which is located in the same plane as plate 12 supports the lower parts of five substantially U-shaped electric contacts, each of the above-mentioned five compartments containing one such contact, e.g. 13. These five electric contacts are fixed on a common L-shaped metal strip 14. Part of this strip 14 is mounted on top of the intermediate transverse wall 8 and another part extends along the side wall 2 where it is electrically connected at its left-hand end (not shown) to an electric ground as is schematically indicated in FIG. 1. Plate 12 supports the lower parts of five substantially U-shaped electric contacts, each of the five compartments containing one such contact, e.g. 15. Each contact 15 is fixed on a longitudinal metal strip 16 which is mounted along the lower part of longitudinal wall 9 and is connected at its left-hand end (not shown) to one of the conductors of a telephone line. The top edge of the strip 14 is located in the same horizontal plane as the top edges of the walls 9 and these top edges constitute a support for the top cover 6. Likewise, the bottom edges of the strips 16 are located in the same horizontal plane as the bottom edge of the wall 8 and these bottom edges form a support for the bottom plate 7.

A surge protector such as 17 is mounted in each of the five compartments. It includes a heat and electricity conducting body 18 with coaxial electrodes 19 and 20 at its ends, the electrodes being separated by an internal arc gap (not shown). Electrode 19 is electrically and thermally connected to the body 18, while electrode 20 is electrically isolated from this body 18. A contact member 21 is mounted in cantilever fashion on the body 18 and is substantially parallel to the longitudinal axis of this body and spaced therefrom. Its left-hand end is in electric and thermal contact with the upper left hand part of the body 18 and its right-hand part is located at a distance from the electrode 20 (FIG. 2).

To mount such a surge protector 17 in the drawer-shaped plug 1 it is sufficient to clip the electrodes 19 and 20 in the corresponding electric contacts 13 and 15 respectively. Thus these electrodes are electrically connected to ground and to the above-mentioned telephone conductor respectively. Also the body 18 is thus connected to ground.

Figure 3:
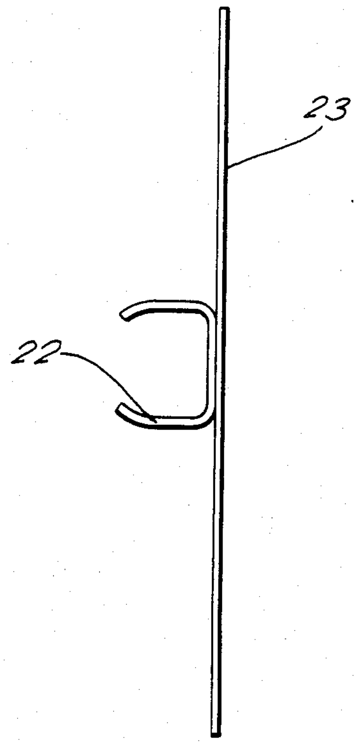
FIG. 3 is a side view of the contact plate 23 shown in FIG. 1.

Instead of providing an individual electric contact member 21 per surge protector 17, in the present embodiment use is made of a comb-shaped contact plate 23 such as shown in FIGS. 1 and 3 having five contact members 21 and a spot welded metal retaining clip 22 by means of which it is clipped around the central protector body 18 out of the five. Because all the bodies 18 of the protectors 17 are grounded, the contact plate 23 also is grounded. The left-hand edge of this contact plate 23 abuts against the upstanding edges 10 of the longitudinal walls 9, as shown in FIG. 2.

The body 18 and electrodes 19, 20 constitute a classical surge protector which is generally available on the market. The contact plate 23 with the member 21 is made of a shape memory alloy marketed under the name PROTEUS (Trademark) with its shape changing abruptly when heated above a predetermined operation temperature.

Upon a fault causing a voltage to be continuously applied to the line conductor connected to contact 20 and producing a continuous internal arc between the electrodes 20 and 19 of the surge protector 17, the body 18 of this protector will heat up and communicate heat to the contact member 21. When the temperature of the latter reaches the predetermined operation temperature of the alloy, the latter changes shape abruptly so that its end located near electric contact 15 assumes the operative position wherein it makes contact therewith. This operative position is schematically shown in dotted line in FIG. 2. In reality the contact member 21, in operative position, may abut against the body 18 near the end thereof adjacent to contact 15 without affecting its correct operation. In the operative position of contact member 21 the electrode 20 is grounded so that the current flowing through this electrode is then directly shunted to ground and that the arc heating the body is interrupted so that this body is allowed to cool. The contact member 21 remains in the operative position as long as its temperature remains above the operative temperature but is automatically restored to its initial position after cooling.

While the principles of the invention have been described above in connection with specific apparatus, it is to be clearly understood that this description is made only be way of an example and not as a limitation on the scope of the invention.

We claim:

1. Surge protector with first and second electrodes, with a heat sensitive means and with a contact member which is electrically connected with said first electrode and which is mounted so as to be abruptly brought into contact with said second electrode upon the temperature of said heat sensitive means reaching a predetermined value when receiving heat from said protector, wherein said heat sensitive means is comprised of a material whose shape is a function of its temperature, wherein said protector forms part of an assembly including a plurality of such protectors whose first electrodes are electrically interconnected, and wherein said contact members of said plurality of protectors, which are mounted adjacent one another, form part of a common contact plate electrically and thermally connected to the bodies of said protectors.

2. Surge protector according to claim 1, wherein said contact plate is clipped on only one on said plurality of bodies.

3. Surge protector according to claim 1, wherein said contact plate is comb shaped.

4. Surge protector according to claim 1, wherein said material comprises a shape memory alloy.

5. Surge protector according to claim 1, wherein said contact member also comprises said heat sensitive means.

6. Surge protector according to claim 5, wherein said first and second electrodes are mounted in an electrically and thermally conductive body wherein heat is generated when current flows between said electrodes, said contact member being thermally coupled to said body.

7. Surge protector according to claim 6, wherein sad first electrode and said contact means are electrically connected to said body.

8. Surge protector according to claim 6, wherein said contact member is fixed in cantilever fashion on said body.

9. Surge protector according to claim 8, wherein said cantilever contact member is substantially parallel to the longitudinal axis of said body and spaced therefrom with its free end able to be deflected into contact with said second electrode.

* * * * *